US012600230B2

(12) United States Patent (10) Patent No.: US 12,600,230 B2
Maitre (45) Date of Patent: Apr. 14, 2026

(54) POWER TAKE-OFF FOR A VEHICLE

(71) Applicant: VOLVO TRUCK CORPORATION,
Gothenburg (SE)

(72) Inventor: Julien Maitre, Chuzelles (FR)

(73) Assignee: VOLVO TRUCK CORPORATION,
Gothenburg (SE)

( * ) Notice: Subject to any disclaimer, the term of this
patent is extended or adjusted under 35
U.S.C. 154(b) by 0 days.

(21) Appl. No.: 18/601,458

(22) Filed: Mar. 11, 2024

(65) Prior Publication Data

US 2024/0317047 A1 Sep. 26, 2024

(30) Foreign Application Priority Data

Mar. 22, 2023 (EP) ..................................... 23163556

(51) Int. Cl.
B60K 17/28 (2006.01)
B60W 30/188 (2012.01)
B60K 25/00 (2006.01)

(52) U.S. Cl.
CPC ......... B60K 17/28 (2013.01); B60W 30/1888
(2013.01); B60K 2025/005 (2013.01); B60Y
2200/221 (2013.01)

(58) Field of Classification Search
CPC ..................................................... B60K 17/28
See application file for complete search history.

(56) References Cited

U.S. PATENT DOCUMENTS

| | | | | |
|---|---|---|---|---|
| 11,850,928 B2 * | 12/2023 | Seemann | ................. | B60K 1/02 |
| 2016/0288642 A1 * | 10/2016 | Rode | ...................... | B60K 17/35 |
| 2021/0362593 A1 * | 11/2021 | Van Dingenen | ....... | B60K 6/365 |

FOREIGN PATENT DOCUMENTS

| | | | | | |
|---|---|---|---|---|---|
| DE | 102016124369 A1 * | 6/2018 | | ............... | F16D 1/10 |
| DE | 102021210589 A1 * | 3/2023 | | ............... | A01B 1/06 |
| EP | 2562442 A1 * | 2/2013 | | ............. | B60K 17/08 |
| GB | 163527 A | 5/1921 | | | |
| GB | 2546321 A * | 7/2017 | | ........... | F16H 57/023 |
| JP | S61113522 A | 5/1986 | | | |
| JP | S63240434 A | 10/1988 | | | |
| JP | H0867166 A | 3/1996 | | | |
| JP | 2014034267 A | 2/2014 | | | |
| KR | 102240606 B1 * | 4/2021 | | ............... | B60K 5/12 |
| WO | 2005123427 A1 | 12/2005 | | | |

OTHER PUBLICATIONS

European Communication pursuant to Article 94(3) EPC dated Jun.
12, 2025 in corresponding European Patent Application No. 23163556.
6, 4 pages.
Extended European Search Report in corresponding European Appli-
cation No. 23163556.6 dated Aug. 1, 2023 (7 pages).

* cited by examiner

*Primary Examiner* — Nicole T Verley
(74) *Attorney, Agent, or Firm* — Jeffri A. Kaminski;
Venable LLP

(57) ABSTRACT

A power take-off device for a vehicle provided with a first
driven rear axle including a differential and a second rear
axle is provided. The power take-off device comprises a
connection bracket having a first side arranged to be
attached to a wheel with a plurality of wheel nuts, where the
connection bracket is provided with a plurality of attachment
holes, and a second side comprising a power take-off inter-
face to which an auxiliary equipment can be connected.

14 Claims, 7 Drawing Sheets

POWER TAKE-OFF FOR A VEHICLE

TECHNICAL FIELD

The present invention relates to a power take-off (PTO) for a vehicle provided with a rear axle comprising a differential. The rear axle can be raised from the ground such that it can rotate freely. The rear axle may be driven with either an internal combustion engine or an electric motor. The PTO provides a simple solution for temporarily driving an auxiliary equipment with a truck that is not provided with a fixedly installed PTO.

BACKGROUND

Different types of vehicles are provided with a power take-off (PTO) arranged to power an auxiliary equipment of some type. Agricultural vehicles such as tractors are often provided with a rear PTO to which different equipment, both stationary and movable, can be connected and driven by the engine of the tractor. Examples of such equipment are e.g. a pump, a concrete mixer, a vegetal crusher, a wood splitter, etc. This type of PTO is not intended for a fixedly installed equipment. The interface is often a standardized interface provided with splines that all different equipment uses.

Trucks are often also provided with one or more fixedly installed PTO's. Such a PTO may be installed before or after the transmission and is intended for fixedly installed equipment, such as a crane, a concrete mixer, a pump, a ladder, etc., and are used by dedicated trucks such as fire fighters, concrete mixers, garbage collectors, refrigerating vehicle, etc. Such a PTO is most often hydraulic and connects to the equipment with hydraulic hoses. This type of PTO is not suitable for the temporarily connection of an auxiliary equipment.

Even if this system may function well for its intended use, there is room for an improved power take-off for a vehicle.

SUMMARY

An object of the invention is therefore to provide an improved PTO device for a vehicle. A further object of the invention is to provide a vehicle provided with such a PTO device. A further object of the invention is to provide a method for driving a PTO device.

The solution to the problem according to the invention is defined by the features of the main claims. The other claims contain advantageous further developments of the PTO device, the vehicle and the method.

A power take-off device for a vehicle provided with a first driven rear axle comprising a differential and a second rear axle, the object of the invention is achieved in that the power take-off (PTO) device comprises a connection bracket having a first side arranged to be attached to a wheel with a plurality of wheel nuts, where the connection bracket is provided with a plurality of attachment holes, and a second side comprising a power take-off (PTO) interface to which an auxiliary equipment can be connected.

By this first embodiment of the PTO device, auxiliary equipment can be powered with a truck that is not provided with a fixedly attached PTO. Further, the PTO device is adapted to temporarily power relatively simple auxiliary equipment such as pumps, circular saws, concrete mixers, etc. The PTO device is attached to a wheel of a truck with some of the wheel nuts. Since the PTO device is adapted to be attached to a wheel with a few of the wheel nuts, all wheel nuts do not have to be removed in order to attach the PTO device. In this way, the wheel can remain on the truck and the device can be attached to the wheel when the wheel stands on the ground, which allows for a secure attachment of the PTO device.

The PTO device is adapted to be used on a truck provided with a first driven rear axle comprising a differential and a second rear axle, where the rear axles are air suspended. In this way, the first rear axle can easily be raised by inflating the air bellows of the second axle. The inflation of the air bellows of the second rear axle lifts the frame of the truck and thus also the first driven rear axle. It is also possible to deflate the air bellows of the first rear axle when the air bellows of the second rear axle are inflated. When the first rear axle is raised such that the wheels of the first rear axle are not touching the ground, the first rear axle can rotate freely when driven by the power source of the truck. The wheel brake of the wheel on which the PTO device is attached is released, and the wheel brake of the other wheel is engaged such that the wheel cannot rotate. Due to the differential, only the wheel with the PTO device will now rotate. This will allow an auxiliary equipment to be driven by the truck. It should be noted that the first rear axle may be any of the rear axles, either the forward rear axle or the rearward rear axle. First in this context means one of the axles, and second means the other axle.

In the inventive method, the steps of; attaching the PTO device to a wheel of the first rear axle with a plurality of wheel nuts; raising the first rear axle from the ground; releasing a wheel brake of the wheel provided with the PTO device, and engaging a brake of a wheel opposite the wheel to which the PTO device is attached; attaching an auxiliary equipment to a PTO interface of the PTO device; and driving the first rear axle such that the PTO device rotates are enclosed.

BRIEF DESCRIPTION OF THE DRAWINGS

The invention will be described in greater detail in the following, with reference to the attached drawings, in which.

DETAILED DESCRIPTION

The detailed description set forth below provides information and examples of the disclosed technology with sufficient detail to enable those skilled in the art to practice the disclosure.

The embodiments of the invention with further developments described in the following are to be regarded only as examples and are in no way to limit the scope of the protection provided by the patent claims.

Figure 1:
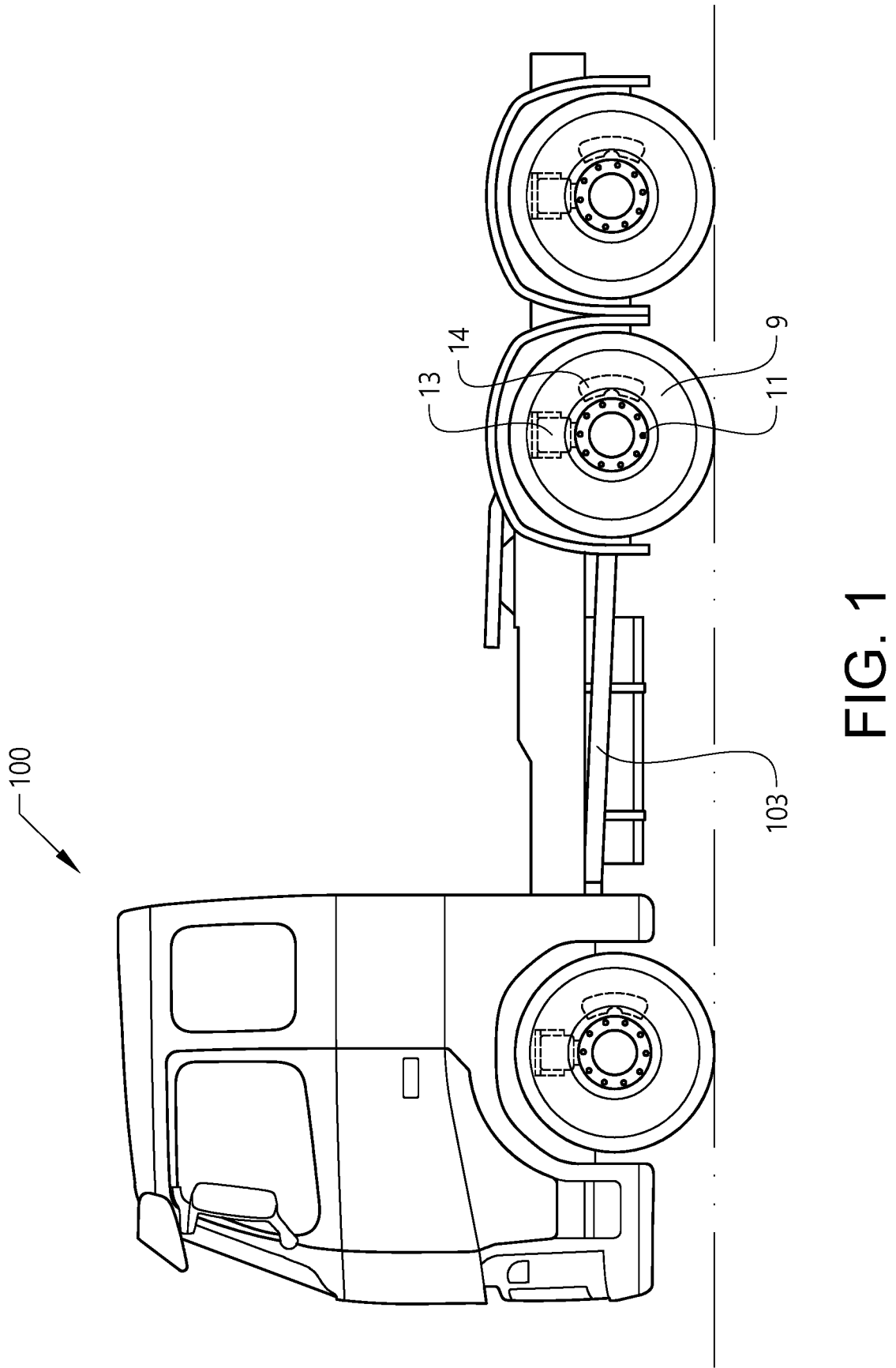
FIG. 1 shows a schematic vehicle according to the invention.
Figure 2:
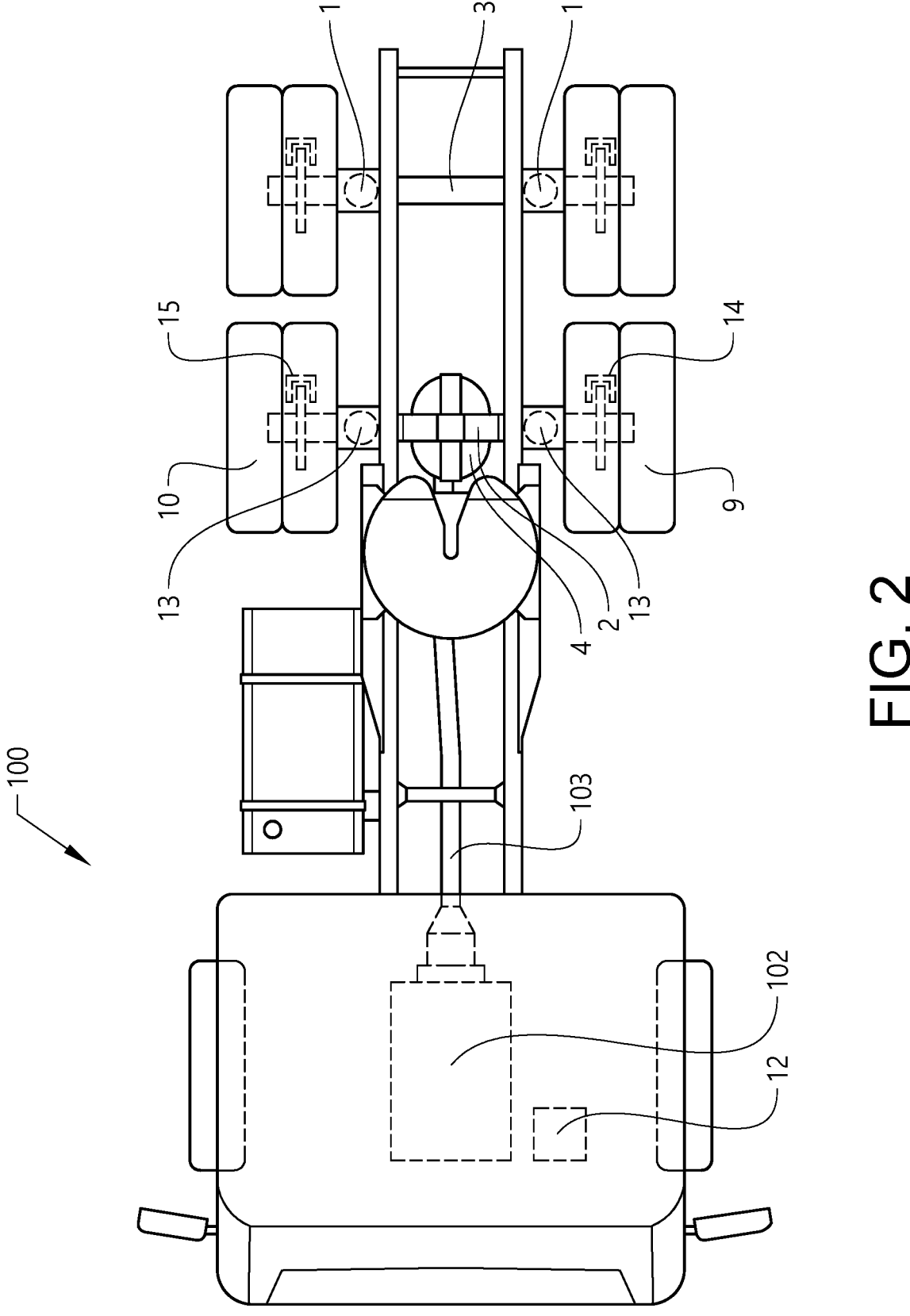
FIG. 2 shows a cross-section of a vehicle.
Figure 3:
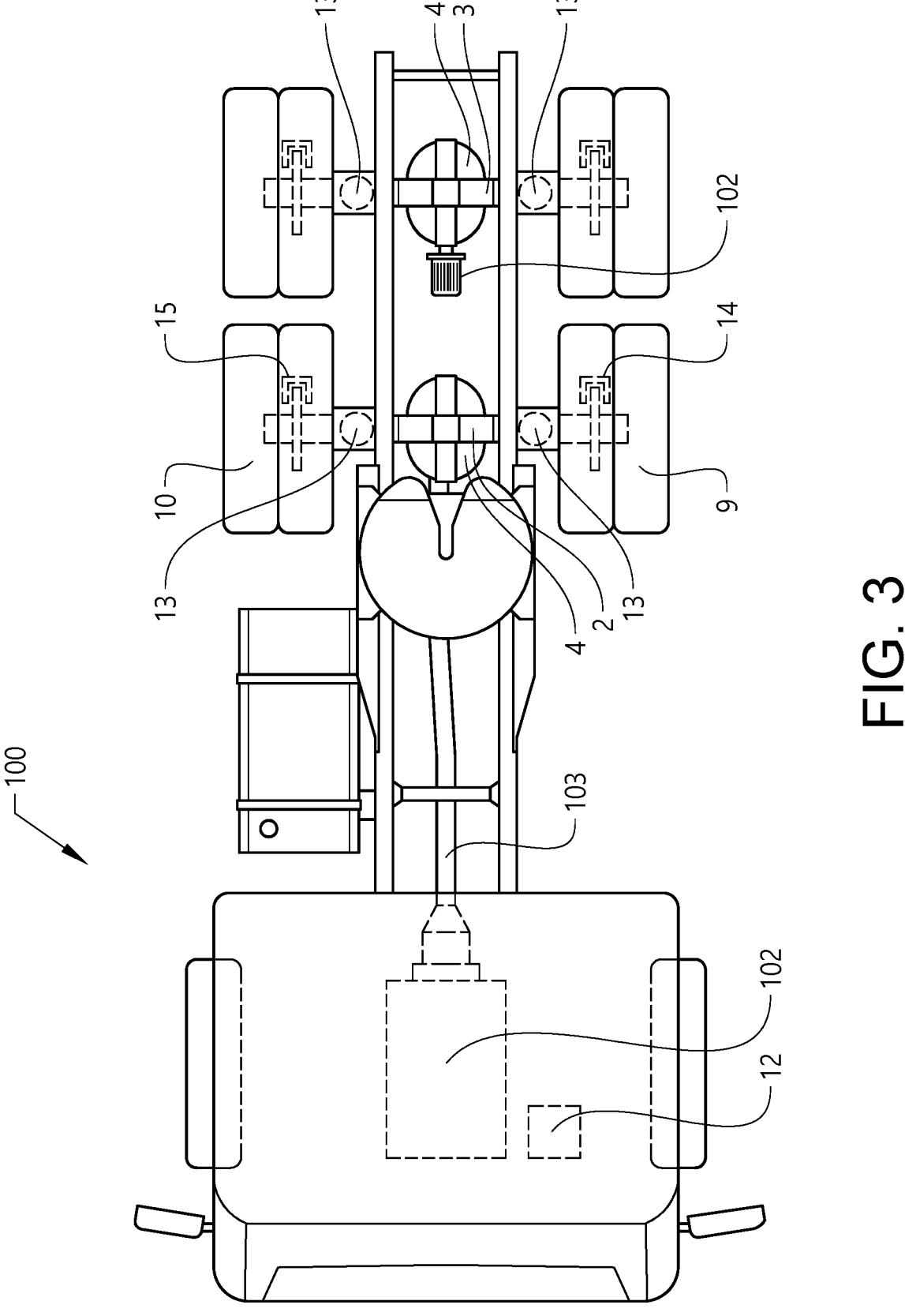
FIG. 3 shows a cross-section of a vehicle having a rear axle driven by an electric motor.

FIGS. 1 to 3 show a schematic vehicle 100 provided with a first driven rear axle 2 and a trailing second rear axle 3. The driven first rear axle 2 is provided with a differential 4 that is arranged to divide the torque to the first right wheel 9 and to the second left wheel 10 on the axle, depending on the traction of the wheels. The trailing second rear axle 3 may be driven or non-driven. The vehicle could be provided with a further rear axle. The vehicle is preferably provided with a driven axle that can be raised from the ground.

The driven axle can be raised from the ground in two different ways. In one way, the air bellows of the second, non-driven rear axle are inflated when the air bellows of the first, driven rear axle are deflated, which will lift the frame of the truck and thus also the first driven rear axle. In another way, the air bellows of the first, driven rear axle are deflated when the air bellows of the second rear axle are inflated. This will raise the first, driven rear axle. For this reason, the vehicle is provided with an air suspension, such that each rear axle is suspended with air bellows 13 that can be inflated with a compressor of the vehicle and that can be deflated when required. The air bellows of each axle can be controlled individually, such that a non-driven axle can be raised when the truck is empty. The air suspension acts as the wheel suspension of the vehicle, and is also used to control the ride height of the vehicle.

The vehicle is further provided with a power source 102, which may be an internal combustion engine or an electric motor. An internal combustion engine is connected to the driven rear axle 2 with a propeller shaft 103 that transmits the drive power form the engine to the rear axle through the differential. When an electric motor is used, it may also drive the rear axle through a propeller shaft, or may be arranged directly on the differential of the driven axle 2, as shown in FIG. 3. The track may be provided with both an internal combustion engine and an electrically driven rear axle, or only with an electrically driven rear axle. In the shown example, the electrically driven rear axle is the second rear axle 3.

Each wheel of the vehicle is also provided with individually controlled wheel brakes, such that the braking power applied to each wheel can be controlled separately. Individual brakes can be used to stabilize the truck and to avoid glazing by applying the brakes individually when required. The shown vehicle is provided with a first wheel brake 14 arranged to brake the first wheel 9 and a second wheel brake 15 arranged to brake the second wheel 10. The other wheels are of course also provided with wheel brakes, but are not shown in detail.

Figure 4:
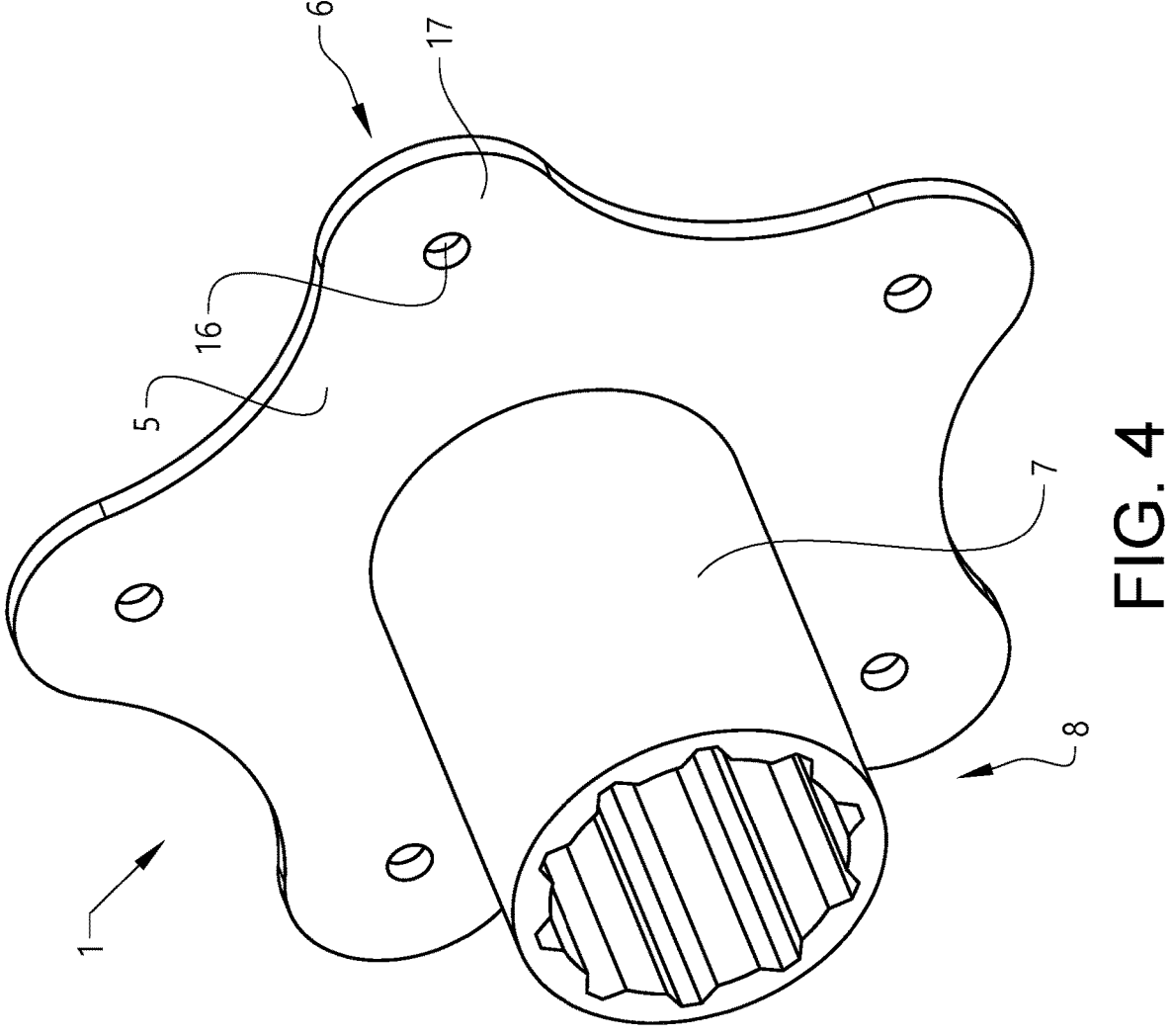
FIG. 4 shows a first example of a PTO device.
Figure 5:
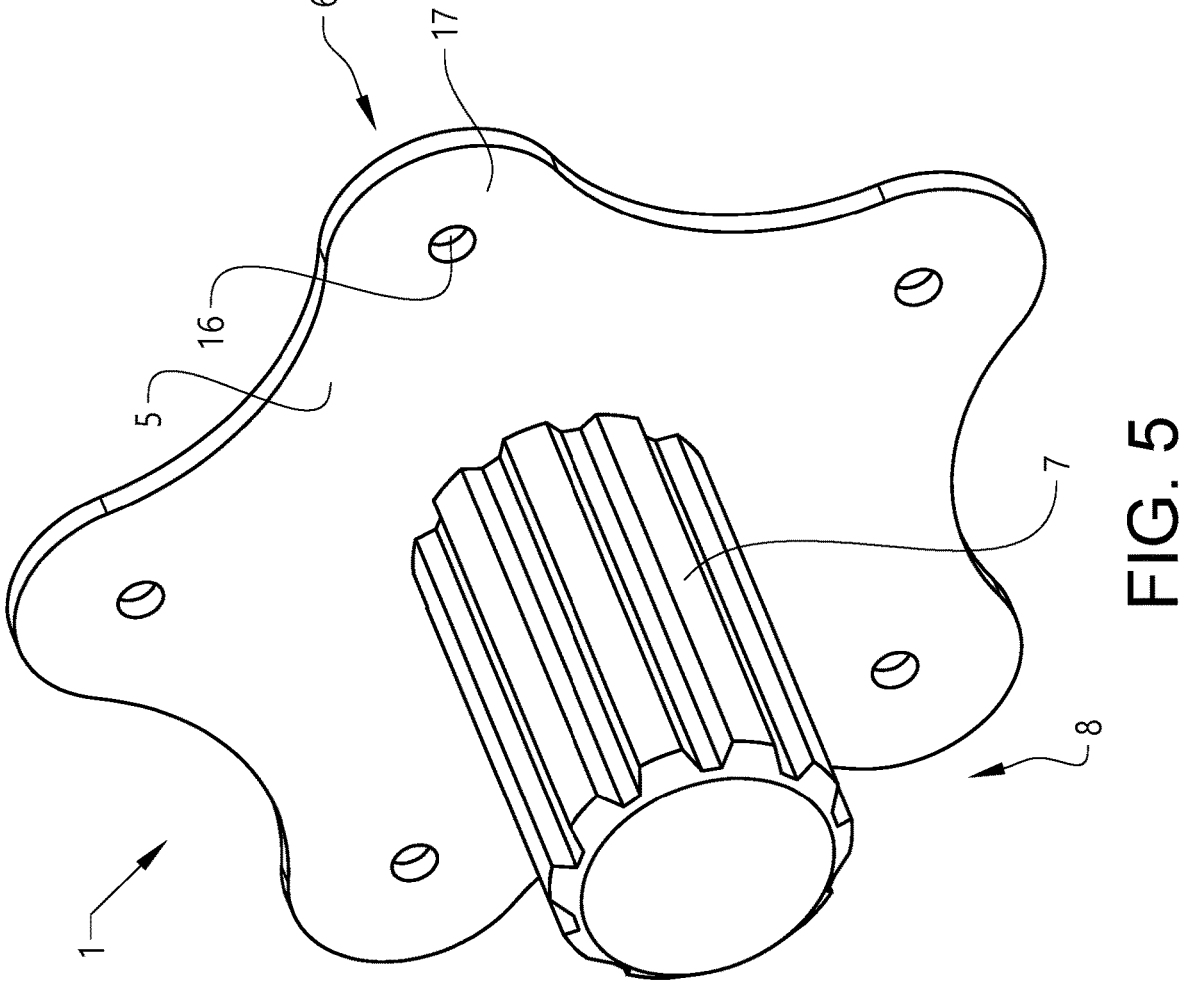
FIG. 5 shows a second example of a PTO device.

The power take-off device (PTO) 1, shown in FIGS. 4 and 5, comprises a connection bracket 5 arranged at a first side 6 of the PTO device 1, and a PTO interface 7 arranged at a second side 8 of the PTO device. The connection bracket 5 is adapted to be attached to a wheel of the truck with a plurality of wheel nuts 11 through holes of the connection bracket. In the shown example, the shape of the connection bracket is provided with five extending attachment wings 17 each provided with an attachment hole 16. Each attachment hole corresponds to a wheel bolt of a wheel. Between the attachment wings, voids are provided that correspond to the remaining wheel nuts, such that all wheel nuts do not have to be removed in order to attach the PTO device to a wheel. In the shown example, every other wheel nut is used to attach the PTO device, and since the wheel is provided with ten wheel nuts, the PTO device is provided with five attachment holes. It would be possible to attach the PTO device with e.g. three or four wheel nuts, depending e.g. on the type of used wheel.

In another example, the connection bracket is a circular disc provided with a plurality of attachment holes 16 that will interact with the wheel screws of the wheel. In the shown example, the PTO device is attached to the wheel with five wheel nuts, i.e. every second wheel nut is used to attach the PTO device to the wheel. The PTO device is provided with larger openings in between the attachment holes 16 such that the remaining wheel nuts will fit in the larger openings.

Figure 6:
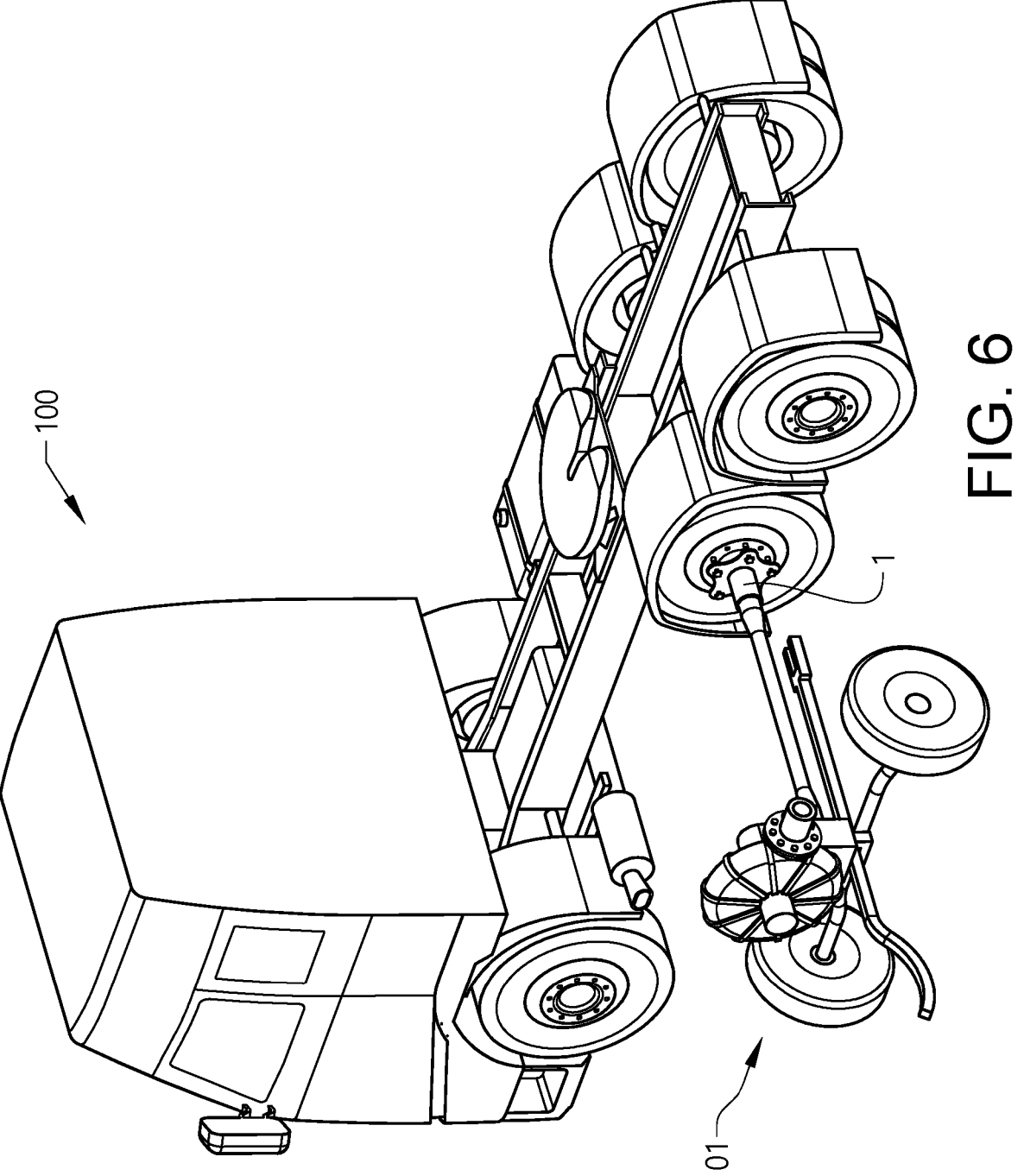
FIG. 6 shows the vehicle driving an auxiliary equipment.

The PTO interface 7 of the PTO device 1 is adapted to cooperate with an interface of an auxiliary equipment 101. In a first example shown in FIG. 4, the PTO interface 7 comprises a short tubular member provided with internal splines that can interact with a splined rod. In a second example, shown in FIG. 5, the PTO interface 7 comprises a standardized agricultural PTO interface, e.g. according to ISO 500, such that e.g. a standard pump or the like can be attached to the PTO device and can be powered by the vehicle. In this example, the PTO interface comprises a member provided with external splines. In another example, the PTO interface 7 is provided with a belt pulley such that any equipment driven by a belt, such as a pump or a circular saw, can be attached to the PTO interface and can be powered by the vehicle. The PTO interface 7 may also be provided with a screw connection to which e.g. a drive axle can be attached. FIG. 6 shows an example of a truck powering an auxiliary equipment with a PTO device.

Figure 7:
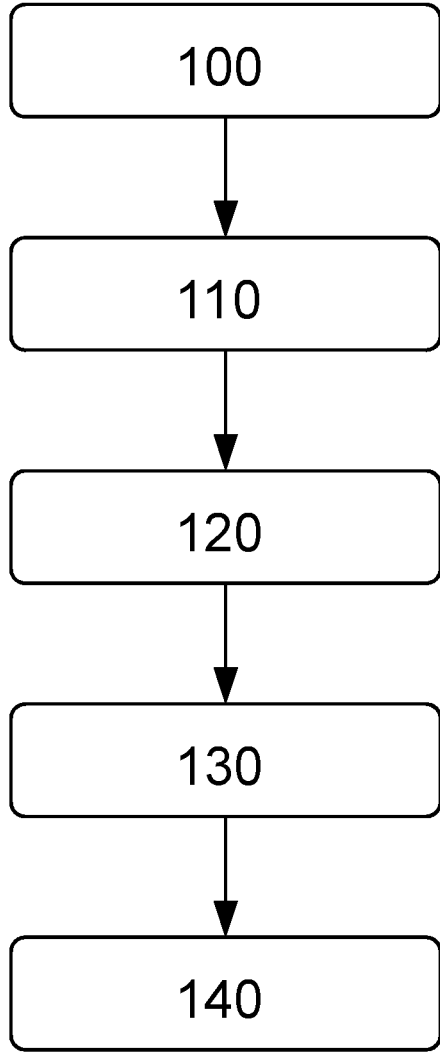
FIG. 7 shows a flow chart of the method.

FIG. 7 shows a schematic flow chart of the method for driving an auxiliary equipment with a vehicle. The vehicle comprises at least two rear axles, where one is driven by a power source through a differential.

In step 100, the PTO device 1 is attached to a wheel, in the shown example to the first wheel 9. Some of the wheel nuts holding the wheel are released. In the shown example, five wheel nuts are released. The connection bracket 5 of the PTO device 1 is placed with the holes 16 over the exposed wheel screws, and the wheel nuts 11 are reattached such that the PTO device is held securely by the wheel nuts.

In step 110, the first driven rear axle 2 is raised such that the first wheel 9 and the second wheel 10 are raised from the ground. In the shown example, the second rear axle is lowered with the air suspension by inflating the air bellows of the second rear axle. The pressure in the air bellows will cause the rear part of the frame of the truck to raise, such that the first rear axle is raised. It is also possible to raise the first driven rear axle by deflating the air bellows of the first rear axle.

In step 120, the auxiliary equipment is attached to the PTO interface. This is done in a suitable manner, depending on the type of auxiliary equipment.

In step 130, the brake of the wheel provided with the PTO device is released and the brake of the wheel not provided with the PTO device is engaged. In the shown example, the first wheel brake 14 of the first wheel 9 is released such that the first wheel can rotate freely, and the second wheel brake 15 of the second wheel 10 is applied fully, such that the second wheel is blocked. Preferably, the other wheel brakes of the vehicle are also applied, such that the vehicle cannot move.

In step 140, a drive mode of the vehicle is engaged such that the driven rear axle is provided with power. Depending on the required rotational speed of the auxiliary equipment, a suitable gear and a suitable engine speed is selected. The power is applied to the differential, which diverts all the power to the first wheel, since the second wheel is blocked by the brake. By changing the rotational speed to the wheel, the speed of the auxiliary equipment can be controlled.

The vehicle is provided with an electronic control unit (ECU) 12 that is arranged to control different steps of the method. The ECU is preferably integrated in an ordinary control unit of the vehicle, but may also be a stand-alone unit. The vehicle is provided with a human-machine interface (HMI) by which a user can set up and control the PTO function. The HMI is in one example integrated in a menu system of the vehicle, where the parameters may be set. In another example, the HMI comprises a number of dedicated push buttons or rocker switches that allows a user to select the settings.

In one example, the HMI comprises one button that can activate/deactivate the PTO function. When this button is pressed, the ECU will first check that the driven axle is raised. If the axel is not raised, the PTO function will not be activated. Optionally, the driven axle could be raised when the button is pressed. If the axle is raised, the wheel brake of the wheel without the PTO device will be engaged fully, and the wheel brake of the wheel provided with the PTO device is released completely. It is possible to select on which side the PTO device is attached, either in a menu system or with a dedicated push button.

When the activation button is pushed, all wheel brakes of the vehicle are preferably activated, such that the vehicle cannot move, or the ECU can detect if the parking brake is activated, and will not activate the PTO function without the parking brake being activated.

When the axle is raised and the respective wheel brakes are engaged/released, the ECU sends a speed signal to the engine. The speed signal may be controlled by pushing the accelerator pedal, but is preferably set either in a menu system or by two push buttons, one +button and one –button. By pushing the +button, the speed of the engine is increased and by pushing the –button, the speed of the engine is decreased. It is further possible to use more push buttons, where one button may be used to set a desired speed and store it in a memory, and another button that resumes the set speed.

The invention is not to be regarded as being limited to the embodiments described above, a number of additional variants and modifications being possible within the scope of the subsequent patent claims.

What is claimed is:

1. A vehicle including a first driven rear axle comprising a differential and a second rear axle, and a power take-off (PTO) comprising a connection bracket having a first side arranged to be attached to a wheel with a plurality of wheel nuts, where the connection bracket is provided with a plurality of attachment holes, and a second side comprising a power take-off (PTO) interface to which an auxiliary equipment can be connected.

2. The vehicle according to claim 1, wherein the PTO interface is a standardized agricultural PTO according to ISO 500.

3. The vehicle according to claim 1, wherein the PTO interface is provided with a belt pulley.

4. The vehicle according to claim 1, wherein the PTO interface is provided with a screw connection.

5. The vehicle according to claim 1, wherein the connection bracket is adapted to be attached to the wheel with at least five wheel nuts.

6. The vehicle according to claim 1, wherein the first driven rear axle and the second rear axle are air suspended.

7. The vehicle according to claim 1, wherein the first driven rear axle is powered by an electric motor.

8. The vehicle according to claim 1, wherein the first driven rear axle is powered by an internal combustion engine.

9. The vehicle according to claim 1, wherein the vehicle comprises an electronic control unit (ECU) arranged to release a wheel brake of a wheel provided with a PTO device, to engage a wheel brake of a wheel without a PTO device, and to control the rotational speed of the PTO device by controlling the rotational speed of the power source of the vehicle.

10. A method for driving a power-take off device with a vehicle provided with a first driven rear axle comprising a differential and a second rear axle, comprising the following steps:

attaching the PTO device to a wheel of the first rear axle with a plurality of wheel nuts, raising the first rear axle from the ground, releasing a wheel brake of the wheel provided with the PTO device, and engaging a brake of a wheel opposite the wheel to which the PTO device is attached, attaching an auxiliary equipment to a PTO interface of the PTO device, and driving the first rear axle such that the PTO device rotates.

11. The method according to claim 10, wherein the first driven rear axle and the second wheel axle of the vehicle are air suspended, and where the second rear axle is lowered with the air suspension such that the first rear axle with the PTO device is raised above ground.

12. The method according to claim 10, wherein the method is controlled by an electronic control unit (ECU).

13. The method according to claim 10, wherein the ECU receives control input signals to control the method from a number of dedicated push buttons or rocker switches.

14. The method according to claim 10, wherein the ECU receives control input signals to control the method from a menu system.

* * * * *